United States Patent [19]

Warn et al.

[11] Patent Number: 5,790,410
[45] Date of Patent: Aug. 4, 1998

[54] FUEL DISPENSER CONTROLLER WITH DATA PACKET TRANSFER COMMAND

[75] Inventors: Walter E. Warn, Knightdale; Fred K. Carr, Chapel Hill, both of N.C.

[73] Assignee: Progressive International Electronics, Raleigh, N.C.

[21] Appl. No.: 764,296

[22] Filed: Dec. 12, 1996

[51] Int. Cl.[6] .................................................. G06F 17/00
[52] U.S. Cl. ..................... 364/479.02; 235/381; 395/500; 380/52
[58] Field of Search ..................... 235/381; 364/479.02; 369/500; 380/52

[56] References Cited

U.S. PATENT DOCUMENTS

| | | | |
|---|---|---|---|
| 5,384,850 | 1/1995 | Johnson et al. | 380/52 |
| 5,519,851 | 5/1996 | Bender et al. | 395/500 |
| 5,557,529 | 9/1996 | Warn et al. | 364/479.02 |

*Primary Examiner*—Harold Pitts
*Attorney, Agent, or Firm*—Fred K. Carr

[57] ABSTRACT

A fuel dispenser-credit card reader control system for controlling the fuel dispensing process and accepting payment for the fuel dispensed through a card reader is disclosed. The dispenser controller has a microprocessor with read-only-memory for storing operating routines and command code and read-and-write-memory for storing responses. Configuration circuits translate the communication language of the dispenser controller into a communication protocol readable by the dispensers such that the dispensing process of various dispenser brands can be controlled and payment for the fuel accepted. A feature of the disclosure is that the controller includes a command for transmitting an encrypted PIN number data block from the card reader to a site controller without analyzing the data, manipulating the data, or permanently storing the data.

2 Claims, 1 Drawing Sheet

FUEL DISPENSER CONTROLLER WITH DATA PACKET TRANSFER COMMAND

RELATED PATENTS

U.S. Pat. No. 5,270,943 entitled "Fuel Pump Control Card" filed Jan. 3, 1992 in the name of Walter E. Warn and U.S. Pat. No. 5,557,529 entitled "In-Dispenser-Card-Reader Control System" filed Jan. 5, 1995 in the name of Walter E. Warn and Fred K. Carr.

FIELD OF THE INVENTION

The present invention relates to a device and method for controlling fuel dispensers, and more particularly, to a fuel pump control system for controlling dispensers equipped with in-pump-card-readers requiring PIN numbers.

BACKGROUND OF THE INVENTION

Most fuel dispensers located at petroleum retail outlets are controlled by a remote controller which is electrically connected to the dispensers for transferring data signals for monitoring and controlling the dispensing operation. The dispenser controller is a microprocessor (MP) based system with read-only-memory (ROM), read-and-write memory (RAM), and input/output ports for reading and storing information. The controller sends data signals to the dispensers including price per unit to be charged at corresponding pumps, preset limits of fuel to be pumped at corresponding pumps, and pump authorization. Data signals sent from the dispensers to the controller include pump number, pump status, and dispensed fuel volume and value.

Most newer dispenser models include a card reader system for reading credit cards, debit cards, smart cards, and prepaid cards providing a method wherein customers can pay for the fuel dispensed at the dispenser. The system generally includes a card reader, input keys for selecting the type payment desired, input keys for entering personal identification numbers (PIN), a display for prompting the customers, and a printer for printing a receipt of the fuel dispensed. There are several brands of dispensers used in the petroleum industry manufactured by different manufacturers. Each dispenser brand has it own unique protocol for communicating with the controller. Current loop, voltage levels, RS232, RS422, and RS485 are examples of communication used between the controller and the pumps and card readers. These are unsecured data lines.

U.S. Pat. Nos. 5,488,638 and 5,384,850 assigned to Gilbarco, Inc., Greensboro, N.C. relate to a security apparatus for encryption and decryption of PIN numbers for transmission over unsecured data lines. In a typical fueling operation, a customer inserts a credit or debit card into a card reader, and the dispenser reads the card. Either the dispenser, the controller, or a host computer determines if a PIN number is required for the transaction. The customer is requested to enter the PIN number at the dispenser, and the dispenser assembles the PIN number along with the card number to form an encrypted PIN number block which is transmitted to the POS system or site controller. The site controller thereafter sends it to a security module where the encrypted PIN number is decrypted to recover the PIN number. The PIN number is re-encrypted by the security module, and transmitted to the site controller. The site controller thereafter sends it to the host computer for further processing and identity checks. The present disclosure relates to a method of transmitting the encrypted data packet after it has been encrypted by the dispenser to the site controller. The present disclosure does not relate to the process of encrypting and decrypting.

Fuel dispensers with card readers perform two functions: they dispense fuel and accept payment for the fuel dispensed. U.S. Pat. No. 5,270,943 entitled Fuel Pump Control Card having a common inventor and assignee discloses and claims a dispenser control system for controlling different dispenser brands through a pump control card interfaced to a point-of-sales (POS) system, and U.S. Pat. No. 5,557,529 having common inventors and assignee discloses and claims a control system for controlling dispensers with card readers. The present invention improves on the above disclosures by providing a dispenser controller which includes a command for transmitting a packet of information, such as an encrypted PIN number block, to and from the dispenser and controller without manipulating, analyzing, or permanently storing the information.

SUMMARY OF THE INVENTION

In summary, the present invention relates to a fuel dispenser control system for controlling the dispensing process in a dispenser equipped with a credit card reader which requires a PIN number. The dispenser control system is a microprocessor based system with read-only-memory (ROM) and read-and-write-memory (RAM) where a series of commands are stored in either ROM or RAM for controlling the dispensers and accepting payment for the fuel dispensed. The system includes a data packet transfer command for transmitting data such as an encrypted PIN number block from the dispenser to the site controlling computer. The data string is transmitted in a form such that it is not analyzed, manipulated, or permanently stored by the MP in the dispenser controller. The controller utilizes configuration circuits to translate the communication language of the dispenser control system into a communication protocol which is readable by the dispensers so that the dispensing process of various dispenser brands can be controlled and payment for the fuel accepted. Response data from the dispenser during the fueling process is stored in the RAM, and then passed up to the site controller computer.

Accordingly, the primary object of this invention is to provide a fuel dispenser control system for controlling fuel dispensers with card reader requiring a PIN number through a computer system.

A further object of the present invention is to provide a dispenser control system which can control dispensers with card readers made by different manufacturers.

A further object of this invention is to provide a fuel pump control system which can transmit a data string such as an encrypted PIN number block undistributed.

BRIEF DESCRIPTION OF THE DRAWINGS

Other objects of this invention will appear in the following specification and claims, reference being made to the accompanying drawing which forms a part thereof.

DETAILED DESCRIPTION OF THE INVENTION

Figure 1:
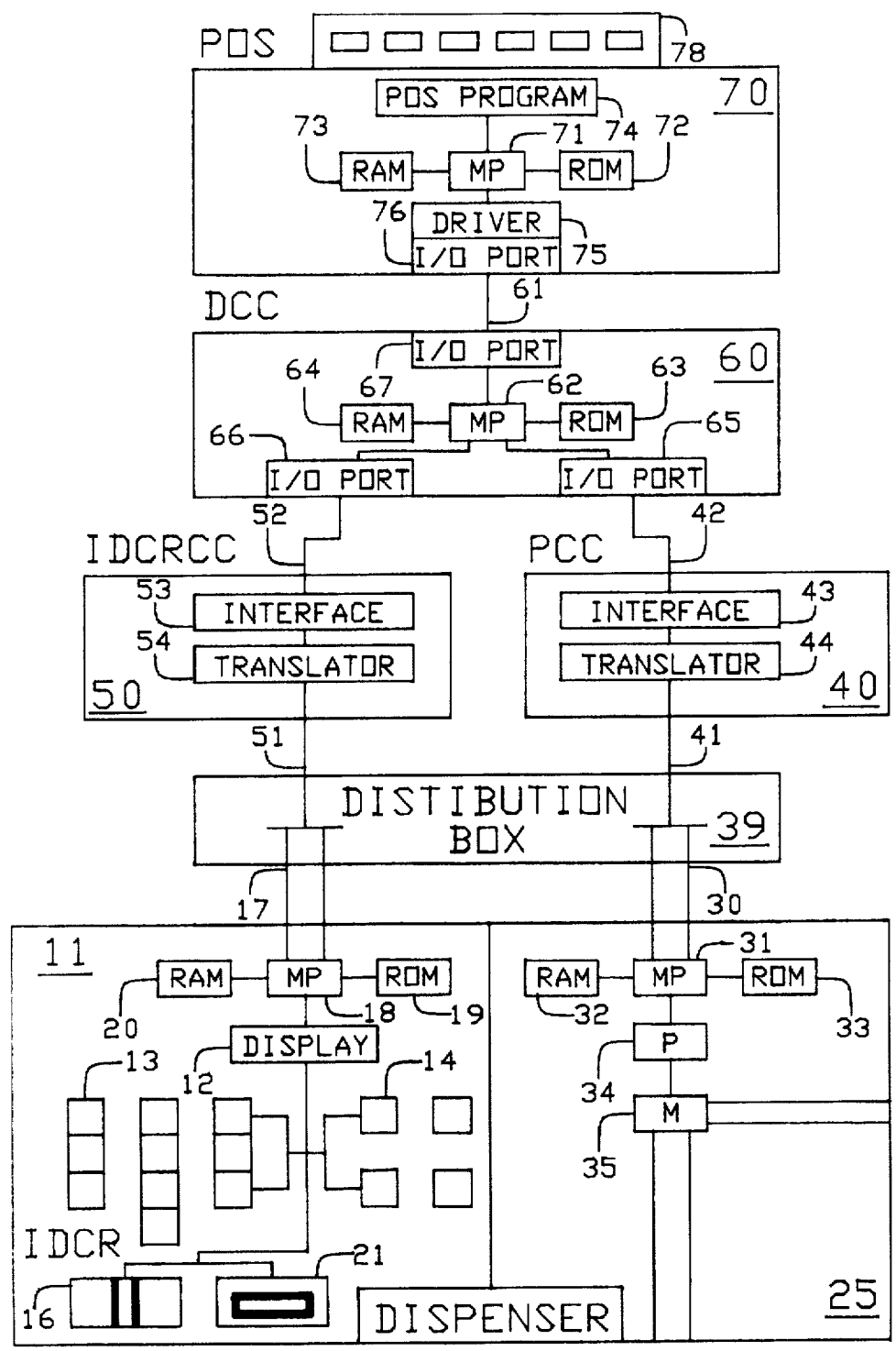
FIG. 1 is a block diagram of the functional components of the invention showing connection of a fuel dispenser having a fuel pump and a card reader to a control computer through a dispenser control system and configuration circuits.

Referring now to the drawings, and first to FIG. 1, there is shown a block diagram of a fuel dispensing system, generally designated (10), including a fuel dispenser with card reader (11), connected to a computer system (70) through a dispenser control board (60) and configurators (40,50). The computer (70) monitors and controls the dispensing process at the dispenser and accepts payment for fuel dispensed at the dispenser through the dispenser control board (60) which transfers data signals to and from the dispensers through data wires. The configurators (40,50) configure the logic signals from the dispenser control board (60) into a protocol format readable by the pumps and card readers in the dispenser.

A dispenser with a card reader controls the dispensing function and it accepts payment for the fuel dispensed. The dispenser can, therefore, be discussed as having a pump control component, generally designated (25), which generally controls the dispensing function, and an in-dispenser-card-reader (IDCR) component, generally designated (11), which accepts payment for the fuel dispensed. The IDCR side (11) of the dispenser generally includes a display (12) for prompting the customer, numeric input key switches (13) for entering information such as PIN numbers, selection key switches (14) for selecting the desired method of payment, a credit/debit card reader (16) for reading cards, and a printer (21) for printing a receipt of fuel dispensed.

In the illustration, communication data wire pairs (17,30) run from the pump distribution box (39) to the dispenser and back to the distribution box (39). A distribution box is a wire connection box where all wires in a communication network have a common connection. This illustration shows a wiring example where the dispensers-controller are communicating in current loop communication. Data wire pair (30) controls the pump side (25) and data wire pair (17) controls the IDCR side (11). The dispenser control board (60) sends data signals (commands) to the dispenser for controlling the dispensing process, and the dispensers send data signals (responses) to the control board. The dispenser control board (60) also sends command signals to the IDCR (25) and the IDCR sends responses to the control board (60). Information send to the dispenser (10) includes price per gallon to be charged for the fuel at corresponding pumps, preset limits for fuel to be dispensed, and pump authorization. Simultaneously, signals are being generated at the dispenser for presentation to the control board (60) including pump number, pump status, and dispensed fuel volume and value for the pump. Dispenser manufacturers use different wiring arrangements and a unique communication protocol for communication between their dispensers and the controller. A wiring example for current loop communication is shown in FIG. 1. Another type communication used in the industry is voltage level. As later discussed, the present invention can control various dispenser brands by using configuration circuits (40,50) to translate command and response signals between the dispenser (10) and the dispenser control board (60).

During a fueling transaction, a customer pulls his vehicle along side the dispenser. The customer removes the nozzle (not shown) and inserts it in his fuel tank. The customer then selects the method of payment by which he wishes to pay for the fuel by pushing one of the input selection keys (14). Generally, there is an input key for: credit at the dispenser, credit inside, cash at the dispenser, and cash inside. If the customer selects credit at the dispenser, he inserts his credit or debit card into card reader (16). The card number is read in a convential way, and the dispenser or computer (70) determines if a PIN number is necessary. The customer is requested to enter his PIN number by display (12). The dispenser assembles the PIN to form an encrypted data string, for example as discussed in U.S. Pat. Nos. 5,488,638 and 5,384,850 assigned to Gilbarco, Inc. The encrypted PIN is then transmitted to the computer (70). The card number is checked for validation, and the dispenser thereafter authorized to dispense fuel.

A feature of the present invention is that the controller (60) includes a data packet transfer command by which a data string, such as encrypted data, can be transmitted from the dispenser to the control computer unaltered. The MP (62) in the control system (60) does not analyze the date, manipulate the date, nor permanently store the data.

The dispenser control board (60) includes a microprocessor (62), Zylog Z80-182 being an example, with associated software programs for processing the pump control and IDCR commands, receiving and storing the response from the pump (25) and IDCR (11). The system includes a read-only-memory chip, ROM (63), for storing the operating routines, and a read-and-write memory chip, RAM (64), for storing variables such as prices to charge for the fuel at the dispensers, totals dispensed by the dispensers, and other response data from the dispensers during the dispensing process. These chips have conventional bus connections with the MP (62). The pump and card reader control commands can be stored in either ROM (63) or RAM (64). Microprocessor (62), ROM (63), RAM (64), I/O ports (65,66,67) and later discussed programming constitute a dispenser control means.

A feature of the dispenser control system (60) is that it has the ability to control several dispenser brands, each of which have their own unique communication protocol. There is further shown in FIG. 1 a block diagram of the dispenser configuration circuit (40) which includes an interface circuit (43) for receiving computer logic signals from the MP (63) in the dispenser controller (60) and a translator circuit (44) for configuring the computer logic signals into digital data signals for controlling the dispenser (10) and configuring the responses from the dispenser into computer logic signals. If the dispenser (10) and the dispenser controller (60) are communicating in current level, the translator (44) includes an opto-coupler with light emitting diode and transistor, commercially available. If the dispenser and controller are communicating in voltage level, the translator (44) includes a comparator (for example LM 393) for configuring the computer logic signals into digital data signals. There is a baud rate chip (not shown) for synchronizing input/output to the MP (60) in the controller (60). The configuration circuit (40) includes a power supply for converting AC to DC including a low voltage regulator providing a constant current or voltage. For example, in a current loop system it provides a constant 45 milliamps. The systems interface circuit (43), the translator circuit (44), and the power supply constitute a dispenser configuration means. Configuration circuits (40,50) are connected to the dispenser control system (60) through cables (42,52), and have a baud rate chip for synchronizing input/output to the MP (62). In the illustration, configuration circuits are shown as a separate components, however, it is understood that the configuration circuits could be included as an integral part of the dispenser control board (60).

Fuel dispensers are widely used in the industry therefore not discussed in detail. Generally on the pump side (25), electronic fuel dispensers have a microprocessor (31) with ROM (33) and RAM (32) for controlling the pumps, valves, flow quantity generators, and related, used during the dispensing operation. The fuel is pumped from a fuel storage tank, not shown, through a metering device (35) into the vehicle. The metering device measures the amount of fuel being dispensed, and is associated with a pulser (34) which sends a pulse signal to the MP (31) indicating the amount of flow. The MP (31), the ROM (33), the RAM (32), the pulser (34), and the meter (35) constitute a pump means.

The fuel dispensing process is under the control of the computer (70) which includes a processing unit (71) with ROM (72) and RAM (73), which in combination with the register application software constitute a site controller computer means. The flow of data between the computer (70) and the dispenser control board (60) is through I/O ports (76,67) which is controlled by a driver (75). Other information can be keyed into the computer (70) through input keyboard (78).

While not shown in the drawing, the site control computer can be associated with a security module. The site controller directs encrypted data received from the PIN pad (13) and the dispenser to the security module and from the security module to the dispensers or to a host computer at a remote location. As previously stated, the present invention is not involved in the encryption process, but rather in transmitting the encrypted data string.

Following is an illustrative example of the communication protocol used in the credit card interface for controlling fuel island card readers. Each reader is activated by sending a keyboard layout, and each reader is sent a printer header and footer message. Commands are passed to and from the reader in "queues." Each queue entry contains enough information to complete the command and is processed in chronological order. The commands are stored in ROM (63) of the dispenser control circuit (60) and include: keyboard configure command, reader status command, key queue control, card queue control, cash queue control, print queue control, display queue control, and key entry control.

In a preferred embodiment of the present invention, the above credit card reader interface commands are used in combination ten commands used to control the pumps during the fueling process. These commands are likewise stored in the ROM (63), and include: pump authorization, sale information, pump stop, pump resume, error, status request, reset, pump totals, blend, and price per unit. The communication protocol for controlling the pump side of a dispenser was disclosed and claimed in U.S. Pat. No. 5,270,943, which is incorporated as an essential reference in this application. Commands are initiated through input keys on the transaction board (78) on the POS (70).

The card reader protocol uses a "2's" compliment check byte. Command and response data are transferred in a formatted frame, starting with a "start of text" (ASCII STX [02]), followed by the command and data or response, followed by the "end of text" (ASCII ETX [03]) and the check byte. All data (except the check byte) are ASCII characters. All commands are one character, the pump number is two characters, the hose number is one character. All commands are "ACKed" (ASCII 06) or "NAKed" (ASCII 15/16), but the responses are not.

```
Command format:
    STX CMD HH [ . . . Data . . . ] ETX CD
        STX = ASCII 02/16
        CMD = command code (one character)
        HH = Reader Number
        Data = programming data or action
        ETX = ASCII 03/16
        CD = check digit
```

The KEYBOARD CONFIGURE COMMAND 'Z' configures the input selection keys in the IDCR and is as follows:

```
Command Format:
    STX Z HH ABCD000000000RSTUVe ETX CD
        HH = Reader number
        0 = NULL
        e = End of String code
    Special Keys
        S = Start code
        E = Enter code
        L = Clear code
        B = Backspace code
        C = Cancel code
        H = Help
        D = Debit
        N = NO
        R = Credit
        Y = Yes
    Response:
        ACK/NAK only
```

The READER STATUS COMMAND 'Y' is used to retrieve status indicators of the card reader section of the controller and is as follows:

```
Command format:
    STX Y Flag ETX [cd]
Response:
    STX S1 S2 S3 RRRRRRRRRRRRRRRRRRRRRRRRRRRR ETX CD
        S1 = bit 7 - don't care
             bit 6 - 1
             bit 5 - reserved
             bit 4 - reserved
             bit 3 - CASH QUEUE FULL
             bit 2 - CASH QUEUE EMPTY
             bit 1 - CARD QUEUE FULL
             bit 0 - CARD QUEUE EMPTY
        S2 = bit 7 - don't care
             bit 6 - 1
             bit 5 - KEY CONFIG QUEUE FULL
             bit 4 - KEY CONFIG QUEUE EMPTY
             bit 3 - KEY QUEUE FULL
             bit 2 - KEY QUEUE EMPTY
             bit 1 - DISPLAY QUEUE FULL
             bit 0 - DISPLAY QUEUE EMPTY
        S3 = bit 7 - don't care
             bit 6 - 1
             bit 5 - PACKET OUT FULL
             bit 4 - PACKET OUT EMPTY
             bit 3 - PACKET IN EMPTY
             bit 2 - PRINT ENTRY ACTIVE
             bit 1 - PRINT QUEUE FULL
             bit 0 - PRINT QUEUE EMPTY
        R = reader dependent status
             bit 7 - don't care
             bit 6 - 1
             bits 5 & 4 (Printer Status)
                00 - NO ERROR
                01 - ERROR
                10 - PAPER OUT
                11 - PAPER LOW
             bit 3 - PRINTER IDLE
             bit 2 - ECHO ON
             bit 1 - NUMERIC ENTRY ONLY
             bit 0 - READER LOGGED
```

The KEY QUEUE CONTROL command 'X' reads or clears entries in the key queue and the command is as follows:

```
Command format:
    STX X Flag ETX CD
    Flag Operation:
        R = Read Entry
        C = Clear Entry
```

Response:
    Clear Operation
        ACK/NAK ONLY
    Read Operation
        STX HH kk.. [NULL] ETX CD
            HH = Reader Number
            k = Returned key code The CARD QUEUE CONTROL command 'W' reads or clears entries in the card queue and the command is as follows.

Command Format:
    STX W Flag ETX CD
        Flag = Operation Type
Flag Operation:
    R = Read Entry
    C = Clear Entry
Response:
    Clear Operation
        ACK/NAK only
    Read Operation
        STX HH track 1 [NULL] track 2 [NULL] ETX CD
            HH = Reader number
            track 1 = Track 1 data
            track 2 = Track 2 data The CASH QUEUE CONTROL command 'V' reads or clears entries in the cash queue and is as follows.

Command Format:
    STX V Flag ETX CD
        Flag = Operation Type
Flag Operation:
    R = Read Entry
    C = Clear Entry
Response:
    Clear Operation
        ACK/NAK only
    Read Operation
        STX HH $$$$.$$ ETX CD
            HH = Reader number
            $$ = Cash amount, decimal implied The PRINT QUEUE CONTROL command 'U' sends a print job to the printer through a queue. Each print job is tagged with the reader number and message type.

Print Job Types:
    H = Header
    F = Footer
    R = Receipt
String Flags:
    OO = First data string
    nn = Subsequent data strings
    FF = Ending string
Data Strings:
    Command
        STX U nn' sss..sss' [NULL] dd ETX CD
            nn = String number
            ss = Print data
            dd = Next string number
    Response
        ACK/NAK only
Ending String:
    Command
        STX U FF hh t ETX CD
            FF = Ending flag
            hh = Reader number
            t = Print job type Response
    ACK/NAK only The DISPLAY QUEUE CONTROL command 'T' sends data to the display unit and is as follows:

Command Format:
    STX T HH 'ss..ss; [NULL] ETX CD
        HH = Reader number
        ss = Display data
Response:
    ACK/NAK only The KEY ENTRY CONTROL command 'S' activates the keyboard and specifies the type keyboard input allowed. The entry can be either: any key, numeric with echo, or numeric without echo.

Command Format:
    STX S HH n e d ETX CD
        HH = Reader number
        n = N (normal) or # (numeric)
        e = e (echo on) or n (echo off)
        d = d (DES encryption on) or n (DES off)
Response:
    ACK/NAK only The BEEPER CONTROL command 'Q' activates the beeper for the specified number of beeps, as is as follows:

Command Format:
    STX Q HH cc ETX CD
        HH = Reader Number
        cc = Number of beeps to Sound
Response:
    ACK/NAK only A feature of the present invention is that the dispenser controller (60) includes a Packet Transfer Command for transmitting a packet of information such as an encrypted PIN number data block from the card reader to the site controller. The information is transmitted in a manner such that the dispenser controller does not analyze the data, manipulate the data, or permanently store the data. The PACKET TRANSFER command 'P' is as follows:

Command Format:
    Write
        STX P Flag HH CCC [...DATA...] ETX CD
            HH = Reader Number
            CCC = Data Character Count
            DATA = Transfer Data Characters
    Read/Clear
        STX P Flag ETX CD
    Flag Operations:
        W = Write
        R = Read
        C = Clear
    Response:
        Write    ACK/ANK only
        Read     STX HH CCC [...DATA...] ETX CD
        Clear    ACK/NAK only If a data character is STX, ETX, or 10 HEX, it must be preceded by a 10 HEX. This character is not part of the byte count. It will be stripped from the command, but the byte following the 10 HEX is included in the CD and the byte count.

Reference is made to U.S. Pat. No 5,557,529 for a discussion and program flow chart of the fuel dispenser-card reader control system, such reference being incorporated as an essential reference in this application. There is also discussed a driver for controlling the flow of information between the POS, or site controlling computer, and the dispenser controller.

The present invention may, of coarse, be carried out in ways other than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A fuel dispenser control system for controlling at least one fuel dispenser having a pump means with a first microprocessor with programmable memory device for dispensing fuel and an in-dispenser-card-reader means with a second microprocessor with programmable memory device for accepting payment for fuel dispensed, used in combination with a computer means having a third microprocessor with programmable memory device for serving as a site controller for the fuel dispensing process, comprising:

(a) a fuel dispenser control means including a printed circuit board with a fuel dispenser control processor including a read-only-memory device for storing a series of commands to control said fuel dispenser during the fueling process and a read-and-write-memory device for storing responses from said dispenser during the fueling process, operatively connected to said first and second microprocessors in said dispenser and to said third microprocessor in said computer means, for (1) reading said second microprocessor in said in-dispenser-card-reader to determine the presence of a customer at said dispenser and how said customer intends to pay for dispensed fuel;

(2) requesting that said customer enter a PIN number into a keypad on said in-dispenser-card-reader and transmitting to said computer means encrypted PIN number block after it has been encrypted by said keypad;

(3) retrieving said commands from said read-only-memory device in a predetermined sequence and outputting said commands in a readable format to said first microprocessor in said dispenser causing said dispenser to dispense fuel;

(4) receiving response data from said first microprocessor during the fueling process and storing said response data in said read-and-write-memory device;

(5) processing and outputting said response data to said third microprocessor in said computer means through a driver interface program to control the flow of data between the two;

(b) a first configuration means functionally connected between said dispenser control processor and said first microprocessor in said dispenser for translating the communication protocols of the two wherein said commands are readable by said first microprocessor and said responses are readable by said dispenser control processor; and (c) a second configuration means functionally connected between said dispenser control processor and said second microprocessor in said dispenser for translating the communication protocols of the two wherein said commands are readable by said second microprocessor and said responses are readable by said dispenser control processor.

2. A method for controlling the fuel dispensing process by a fuel pump-card reader control system including a first microprocessor with read-only-memory for storing control commands and read-and-write-memory for storing responses to said commands, functionally connected to at least one fuel dispenser having a second microprocessor with programmable memory device for dispensing fuel and a third microprocessor with programmable memory device for controlling a credit card reader, and further functionally connected to a computer means having a forth microprocessor with programmable memory device and application program for performing cash register function, where said fuel pump-card reader control system utilizes a fuel pump configuration means to configure commands to and responses from said second microprocessor and a card reader configuration means to configure commands to and responses from said third microprocessor, comprising the steps of:

(a) setting the price per unit of the fuel to be dispensed by said dispenser by sending a command configured by said fuel pump configuration means including command code, fueling position, hose number, read or write operation flag, and unit price, whereas with a write operation flag the price is stored in said memory of said dispenser, with a read operation flag said dispenser responds back to said first microprocessor with response configured by said fuel pump configuration means indicating fueling position, hose number, and unit price stored;

(b) reading a key queue in said card reader by sending a read command configured by said card reader configuration means including read code which is followed by a response format including reader number and key code;

(c) reading a card queue in said card reader by sending a read command configured by said card reader configuration means including read code which is followed by a response configured by said card reader configuration means including reader number and credit card data;

(d) requesting that a PIN number be entered into a keypad on said card reader and transmitting the encrypted PIN number data block after it has been encrypted by said keypad by sending a command configured by said card reader configuration means including command code, reader number, data character count, and transfer data characters;

(e) starting the dispensing process by an authorization command configured by said fuel pump configuration means including command code, fueling position, hose number, and limit amount of fuel to be dispensed;

(f) polling the status of said dispenser by a status request command configured by said fuel pump configuration means including command code, fueling position and hose number, whereafter said dispenser responds with status indicator response configured by said fuel pump configuration means including hose is dispensing fuel, hose is idle, pump handle has been lifted and service is requested at hose; and (g) reading sales information by a sales information command configured by said fuel pump configuration means including command code, fueling position, hose number, and operational flag, whereas with a read operation flag said dispenser responds to said first microprocessor with response configured by said pump configuration means including pump number, hose number, and amount of fuel dispensed, or with a clear operation flag thereby the sale flag is cleared.

* * * * *